United States Patent [19]

Shearin

[11] 4,323,379
[45] Apr. 6, 1982

[54] AIR FILTER PANEL

[75] Inventor: Robert W. Shearin, Henderson, N.C.

[73] Assignee: Facet Enterprises, Inc., Tulsa, Okla.

[21] Appl. No.: 211,460

[22] Filed: Nov. 28, 1980

[51] Int. Cl.³ .............................................. B01D 46/10
[52] U.S. Cl. ................................ 55/511; 55/DIG. 31
[58] Field of Search .......... 55/501, 503, 511, DIG. 31; 229/35; 40/154, 155; 52/656, 658

[56] References Cited

U.S. PATENT DOCUMENTS

| | | | |
|---|---|---|---|
| 742,159 | 10/1903 | Burton | 229/35 |
| 1,150,490 | 8/1915 | Bingaman | 229/35 |
| 2,004,098 | 6/1935 | Andrews | 229/35 |
| 2,220,127 | 11/1940 | Slayter | 55/485 |
| 2,562,590 | 7/1951 | Viglietta | 40/154 |
| 2,869,694 | 1/1959 | Breckheimer | 55/DIG. 31 |
| 2,952,342 | 9/1960 | Schnittker | 52/658 |
| 2,965,197 | 12/1960 | Dow et al. | 55/511 |
| 3,107,990 | 10/1963 | Getzin | 55/501 |
| 3,938,973 | 2/1976 | Kershaw | 55/501 |
| 4,086,071 | 4/1978 | Champlin | 55/501 |

Primary Examiner—David L. Lacey

[57] ABSTRACT

An improved air filter panel of the type having a fibrous filter batt and a circumferential support frame surrounding the batt, the frame having an axially extending frame element, the frame element being folded transversely to form frame sidewalls, the sides of the batt being connected to the sidewalls of the frame, the ends of the folded frame element being fastened together to secure the batt in place within the surrounding sidewalls, the improvement comprising an improved frame end fastening means, the means comprising a tab connected at a fixed end thereof to the sidewall of the support frame adjacent one end of the frame element, the tab having a neck portion at the fixed end and a head portion adjacent a free end thereof, the head portion being connected along a portion of a following edge thereof to the neck portion, the remaining unconnected portion of the following edge providing a flange portion, and a slot in the sidewall adjacent the end of the frame element opposing the tabbed end, the slot being adapted to receive the head of the tab, whereby when the free end of the tab is inserted in the slot, the ends of the folded frame are held together by the tab, and the flange portion of the following edge of the head abuts against an edge of the slot to restrain the tab from being removed from the slot.

10 Claims, 3 Drawing Figures

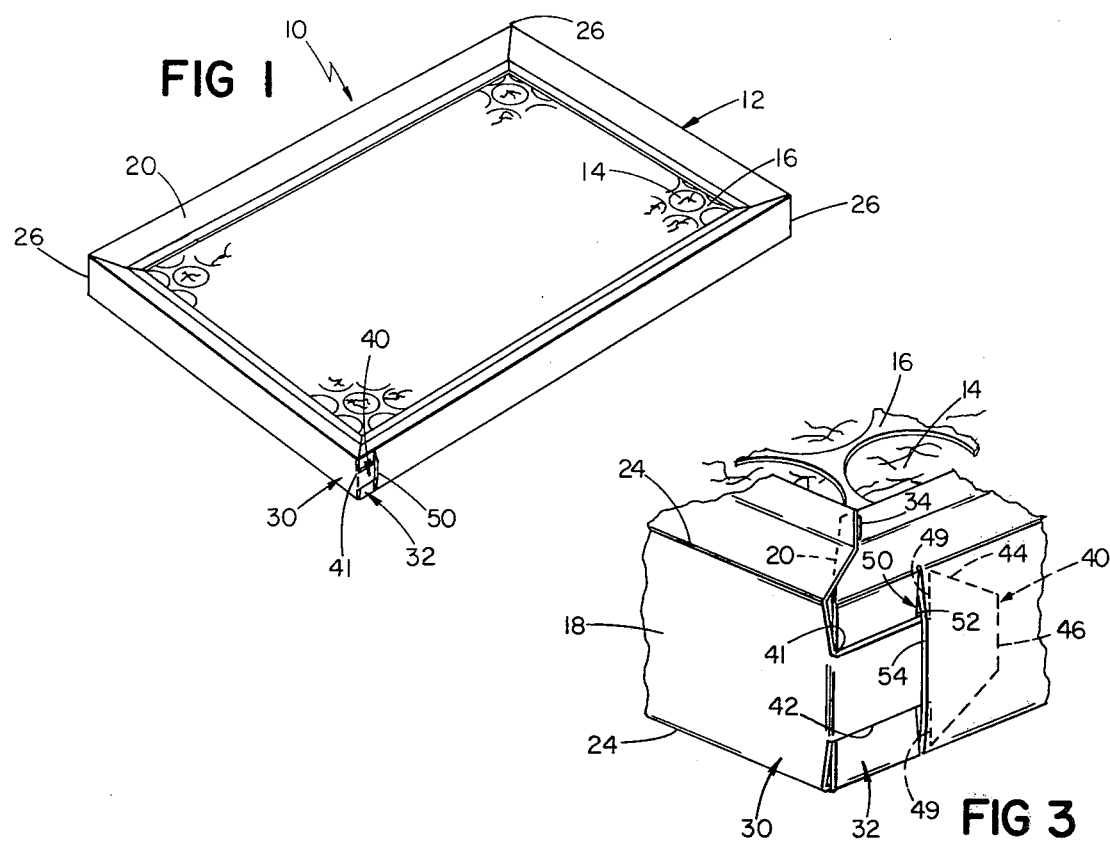
FIG 1
FIG 3
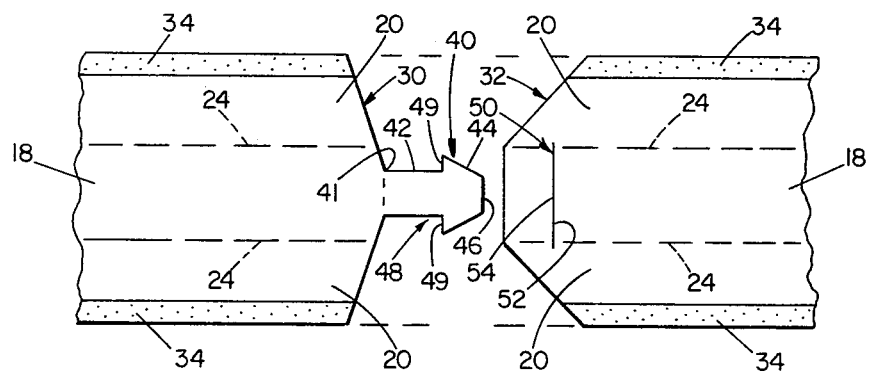
FIG 2

AIR FILTER PANEL

FIELD OF THE INVENTION

This invention relates to disposable air filter panels.

BACKGROUND OF THE INVENTION

Such filters are generally comprised of a fibre or expanded filter medium surrounded by a kraft or cardboard frame. Conventionally the frame is a single sheet of material which is folded around the filter medium and secured at its ends to retain the filter medium. Such a conventional filter is described in Dow et al., U.S. Pat. No. 2,965,197, which I hereby incorporate by reference.

One problem has been to secure the ends of the frame by a means which is both simple and inexpensive, and yet reliable.

Tab and slot arrangements, such as shown in Schnittker U.S. Pat. Nos. 2,952,342 and Champlin 4,086,071, have been used in filters in the past. But such arrangements are often difficult to assemble and do not remain secure.

SUMMARY OF THE INVENTION

I have found an improved frame end fastener which is inexpensive, permits efficiently simple panel fabrication, and provides a reliably effective means for securing the frame ends together.

The invention features an improved air filter panel of the type having a fibrous filter batt and a circumferential support frame surrounding the batt, the frame having an axially extending frame element, the frame element being folded transversely to form frame sidewalls, the sides of the batt being connected to the sidewalls of the frame, the ends of the folded frame element being fastened together to secure the batt in place within the surrounding sidewalls, the improvement comprising an improved frame end fastening means, the means comprising a tab connected at a fixed end thereof to the sidewall of the support frame adjacent one end of the frame element, the tab having a neck portion at the fixed end and a head portion adjacent a free end thereof, the head portion being connected along a portion of a following edge thereof to the neck portion, the remaining unconnected portion of the following edge providing a flange portion, and a slot in the sidewall adjacent the end of the frame element opposing the tabbed end, the slot being adapted to receive the head of the tab, whereby when the free end of the tab is inserted in the slot, the ends of the folded frame are held together by the tab, and the flange portion of the following edge of the head abuts against an edge of the slot to restrain the tab from being removed from the slot.

In preferred embodiments the frame element and tab are an integral strip of cardboard or kraft; the tab is at one end of the frame element and the slot is adjacent another end of the frame element, the ends forming a corner of the support frame; the tab extends along the axis of the frame element, and the following edge of the head portion and the slot are transverse to the axis; the head portion of the tab is a trapezoid, a triangle, or a semicircle; the neck portion of the tab is a rectangle and is narrower in transverse extent than the following edge; the following edge of the head portion is sufficiently narrower in width than the slot such that the head slides easily into the slot and the neck portion of the tab is sufficiently narrower in width than the following edge such that the flange portion is of sufficient extent to provide a sufficient abutting surface against the edge of the slot to lock the head portion within the slot; and the slot, the following edge of the head, and the neck portion of the tab are on the order of ⅞ inch, ¾ inch and ½ inch, respectively.

These and other objects and features of the invention will be understood from the following description of a preferred embodiment.

PREFERRED EMBODIMENT

The structure and operation of a preferred embodiment of the invention will now be described, after first briefly describing the drawings.

DRAWINGS

FIG. 1 is a perspective view, somewhat diagrammatic, of the preferred embodiment of a filter panel according to my invention.

FIG. 2 is a side elevation, partially broken away, of a portion of the filter frame element of the panel of FIG. 1 shown in an intermediate stage of construction.

FIG. 3 is a perspective view, partially broken away, of a corner of the panel of FIG. 1 shown in an intermediate stage of construction.

STRUCTURE

Referring to FIG. 1, air filter panel 10 has a rectangular support frame 12 of stiff cardboard or kraft, a fibrous filter element or batt 14, and a screen or perforated metal backing sheet 16.

As shown in FIGS. 1 and 2, frame 12 is a single sheet of kraft 18 having a pair of flange portions 20, a pair of parallel longitudinally extending score lines 24, three transversely extending corner score lines 26, a tabbed end 30 and a notched end 32. Each of the flange portions has an adhesive strip 34 on its inner surface. End 30 has a tab 40 having a neck portion 42 (⅝ inch long, ½ inch wide) and a trapezoidal head portion 44 (⅜ inch high). Head 44 has a leading edge 46 (⅝ inch wide) and a following edge 48 (¾ inch wide). Following edge 48 has a flange portion 49. End 32 has a slot 50 (⅞ inch wide) having a front edge 52 and a rear edge 54.

OPERATION

Frame element 12 is folded along lines 24 and at corners 26 to enclose filter element 14 and backing sheet 16. Tab 40 is folded at base 41 of its neck portion 42, and head portion 44 of the tab is inserted through slot 50 causing a relative transverse displacement of edges 52 and 54. Flange portion 49 of following edge 48 of the tab abuts against rear edge 54 of the slot, and acts to lock the tab within the slot, thereby holding ends 30, 32 of the frame element together. The panel is then placed in a heat sealing press and adhesive strips 34 of flange portions 20 are pressed against the filter element and the backing to secure the filter element and the backing in place. Further details of the conventional panel construction are provided in said Dow et al., U.S. Pat. No. 2,965,197.

OTHER EMBODIMENTS

Other embodiments of the invention are within the following claims. For example, tab head portion 44 could be in the shape of a triangle, semicircle, or other configuration wherein the tab has a head with a following edge or shoulder which abuts against the rear edge of the slot.

What is claimed is:

1. In an air filter panel of the type having a fibrous filter batt and a circumferential support frame surrounding the batt, the frame having an axially extending frame element, the frame element being folded transversely to form frame sidewalls, the side of the batt being connected to the sidewalls of the frame, the ends of the folded frame element being fastened together to secure the batt in place within the surrounding sidewalls, the improvement comprising an improved frame end fastening means, said means comprising:

a tab connected at a fixed end thereof to the sidewall of the support frame adjacent one end of the frame element, said tab having a neck portion at said fixed end and a head portion adjacent a free end thereof, said head portion being connected along a portion of a following edge thereof to said neck portion, the remaining unconnected portion of the following edge providing a flange portion of said following edge, and a slot in the sidewall adjacent the end of the frame element opposing said tabbed end, said slot being at least as wide as the maximum width of said head of said tab to receive said head in a single sliding movement without bending of said head, said head being fully inserted in said slot, said slot having a free edge facing and parallel to said following edge, thereby producing line contact between said free edge and said following edge opposing withdrawal of said head from said slot.

2. The improved air filter panel of claim 1 wherein the frame element and said tab are an integral elongated strip.

3. The improved air filter panel of claim 2 wherein said strip is cardboard.

4. The improved air filter panel of claim 2 wherein said strip is kraft.

5. The improved air filter panel of claim 1 wherein said tab is at one end of the frame element and said slot is adjacent an opposite end of the frame element, the ends forming a corner of the support frame and said fastening means fastening the frame element ends together at said corner.

6. The improved air filter panel of claim 1 wherein said tab extends along the axis of the frame element, and said following edge and said slot are transverse to the axis.

7. The improved air filter panel of claim 6 wherein said head portion is in the shape of a trapezoid and said following edge is the base of said trapezoid.

8. The improved air filter panel of claim 7 wherein said neck portion is in the shape of a rectangle, said rectangle being narrower in transverse extent than said following edge.

9. The improved air filter of claim 7 wherein said head portion is sufficiently narrower in width than said slot such that said head portion slides easily into said slot, and said neck portion is sufficiently narrower in width than said following edge such that said flange portion is of sufficient extent to provide a sufficient abutting surface against said edge of said slot to lock said head portion within said slot.

10. The improved air filter of claim 9 wherein said slot is on the order of $\frac{7}{8}$ inch and said following edge is on the order of $\frac{3}{4}$ inch and said neck portion is on the order of $\frac{1}{2}$ inch.

* * * * *